US008025568B2

(12) United States Patent
Loose et al.

(10) Patent No.: US 8,025,568 B2
(45) Date of Patent: Sep. 27, 2011

(54) GAMING MACHINE WITH AN OVERHANGING TOUCH SCREEN

(75) Inventors: Timothy C. Loose, Chicago, IL (US); Wayne H. Rothschild, Northbrook, IL (US); Norman R. Wurz, Des Plaines, IL (US)

(73) Assignee: WMS Gaming Inc., Waukegan, IL (US)

( * ) Notice: Subject to any disclaimer, the term of this patent is extended or adjusted under 35 U.S.C. 154(b) by 2100 days.

(21) Appl. No.: 09/821,195

(22) Filed: Mar. 29, 2001

(65) Prior Publication Data

US 2002/0142832 A1 Oct. 3, 2002

(51) Int. Cl.
*A63F 13/00* (2006.01)

(52) U.S. Cl. ............................... 463/30; 463/16; 463/20

(58) Field of Classification Search .............. 463/16–22, 463/30, 1; 273/143 R
See application file for complete search history.

(56) References Cited

U.S. PATENT DOCUMENTS

| | | | | |
|---|---|---|---|---|
| 5,033,744 | A * | 7/1991 | Bridgeman et al. | 463/13 |
| 5,342,047 | A * | 8/1994 | Heidel et al. | 273/85 CP |
| 5,632,679 | A * | 5/1997 | Tremmel | 463/36 |
| 5,769,716 | A * | 6/1998 | Saffari et al. | 463/20 |
| 5,770,533 | A * | 6/1998 | Franchi | 463/42 |
| 5,796,389 | A | 8/1998 | Bertram et al. | 345/173 |
| 5,833,537 | A * | 11/1998 | Barrie | 463/21 |
| 5,951,397 | A | 9/1999 | Dickinson | 463/36 |
| 6,089,976 | A * | 7/2000 | Schneider et al. | 463/16 |
| 6,368,213 | B1 * | 4/2002 | McNabola | 463/18 |
| 6,379,245 | B2 * | 4/2002 | De Keller | 463/13 |
| 6,419,578 | B1 * | 7/2002 | Moody et al. | 463/13 |
| 6,422,940 | B1 * | 7/2002 | Walker et al. | 463/13 |
| 6,439,995 | B1 * | 8/2002 | Hughs-Baird et al. | 463/20 |

FOREIGN PATENT DOCUMENTS

| | | |
|---|---|---|
| EP | 0769679 | 4/1997 |
| EP | 0 789 338 | 8/1997 |
| EP | 0 886 250 | 12/1998 |
| EP | 1 025 886 | 8/2000 |
| EP | 1083531 | 3/2001 |
| GB | 2251112 A * | 6/1992 |
| WO | WO 97/27570 | 7/1997 |
| WO | WO 98/00207 | 1/1998 |

OTHER PUBLICATIONS

Euopean Search Report for Application No. 01402829, dated Nov. 27, 2003 (3 pages).

* cited by examiner

*Primary Examiner* — David L Lewis
*Assistant Examiner* — Robert Mosser
(74) *Attorney, Agent, or Firm* — Nixon Peabody LLP

(57) ABSTRACT

A gaming machine controlled by a processor in response to a wager comprises a display and a unitary touch screen. The display includes a video portion and a non-video portion. The unitary touch screen overlaps both the video portion and the non-video portion. The video portion includes player-selectable first indicia selectable via the unitary touch screen. The non-video portion includes player-selectable second indicia selectable via the unitary touch screen.

11 Claims, 3 Drawing Sheets

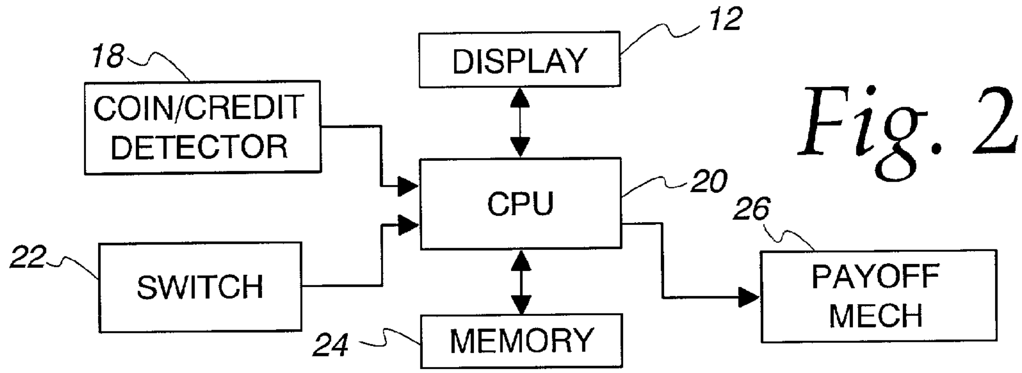
*Fig. 2*
*Fig. 3*
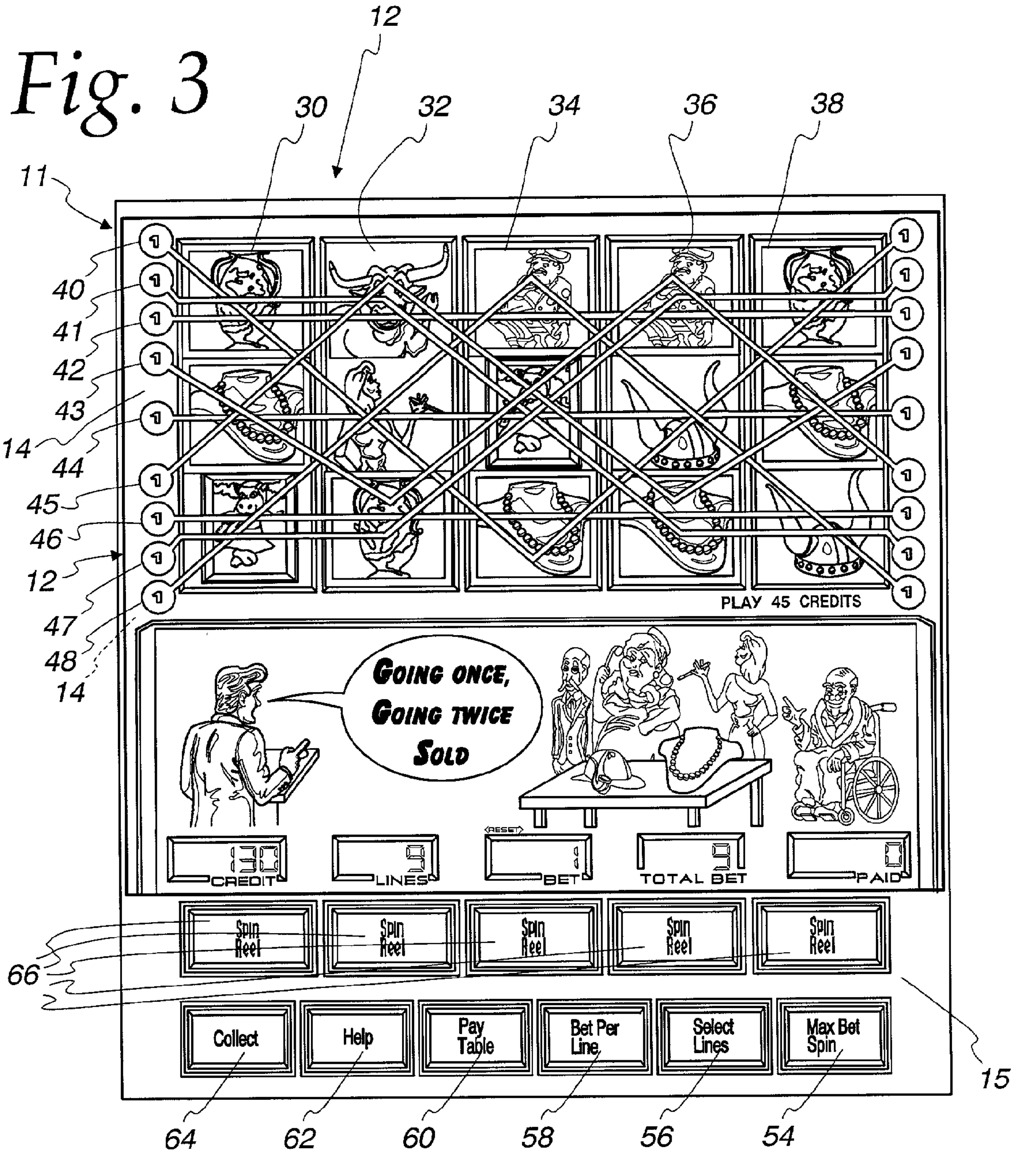

GAMING MACHINE WITH AN OVERHANGING TOUCH SCREEN

FIELD OF THE INVENTION

The present invention relates generally to gaming machines and, more particularly, to a gaming machine with an overhanging touch screen.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available, because such machines attract frequent play and, hence, increase profitability to the operator. Many gaming machines possess a touch screen video display including a video display overlapped by a similarly sized touch screen. The touch screen is typically adhered or taped to a front panel of the video display. The touch screen allows players to determine and easily select game options during play. The video display provides useable game play space typically segregated into first and second portions. The first portion is dedicated to dynamic game features such as dynamic graphics and animations. The second portion is dedicated to static game features such as player-selectable indicia and text boxes. As game designers increase the complexity of games, they are constrained by the amount of useable game play space afforded by the video display. For example, the larger the second portion of the video display dedicated to fairly static game features, the smaller the available first portion for presenting dynamic game features. Similarly, the larger the first portion of the video display dedicated to dynamic game features, the smaller the available second portion for presenting static game features.

To create the most entertaining and exciting gaming machine, there exists a need for a gaming machine with a display arrangement that facilitates presentation of both dynamic and static game features without compromising the ability to present one at the expense of the other.

SUMMARY OF THE INVENTION

A gaming machine controlled by a processor in response to a wager comprises a display and a unitary touch screen. The display includes a video portion and a non-video portion. The unitary touch screen overlaps both the video portion and the non-video portion. The video portion includes player-selectable first indicia selectable via the unitary touch screen. The non-video portion includes player-selectable second indicia selectable via the unitary touch screen.

BRIEF DESCRIPTION OF THE DRAWINGS

The foregoing and other advantages of the invention will become apparent upon reading the following detailed description and upon reference to the drawings.

FIG. 2 is a block diagram of the video gaming machine of FIG. 1.

FIG. 3 is a front view of a display of the gaming machine showing a five reel, nine line game that is played thereon.

Figure 1:
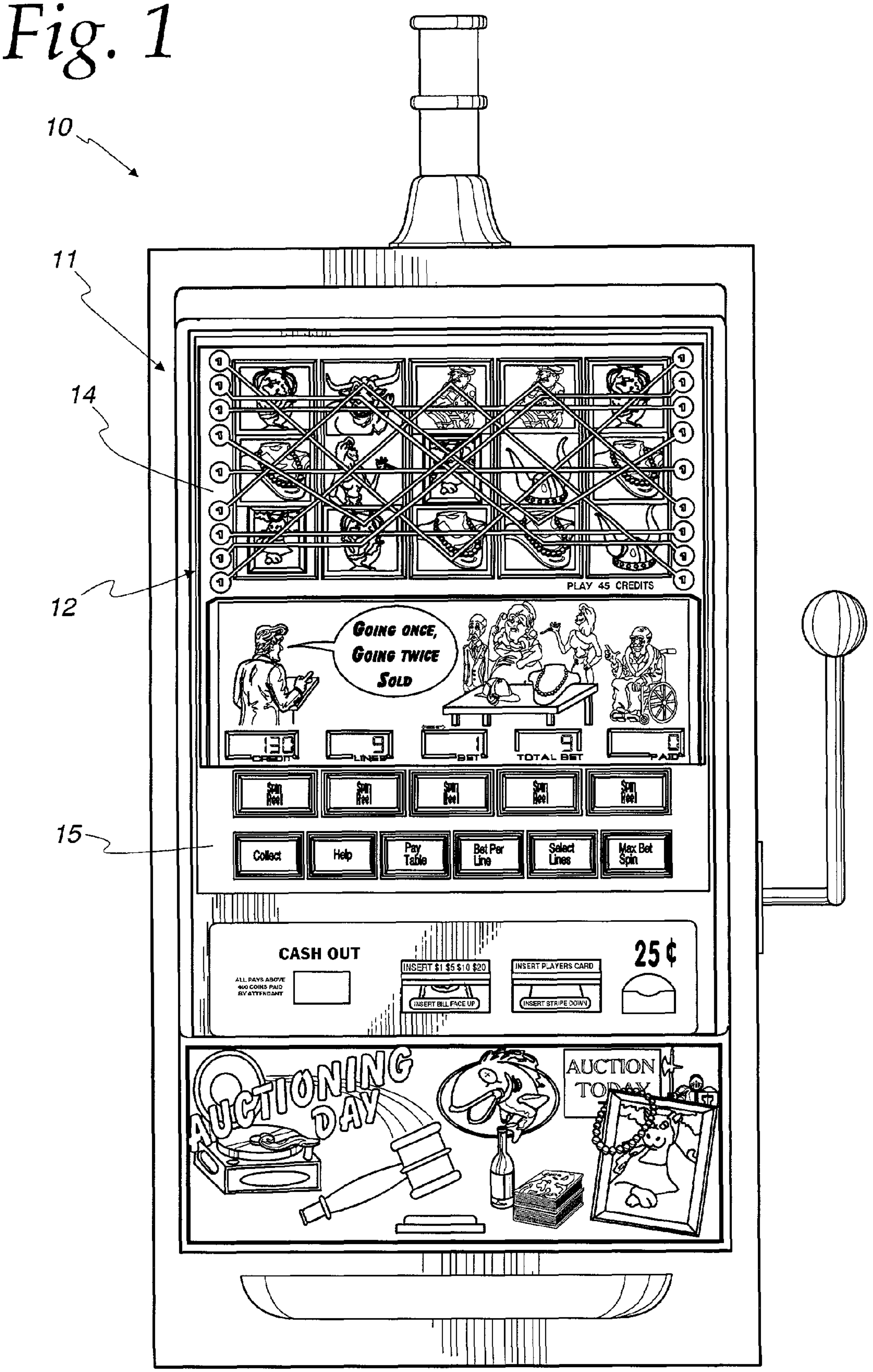
FIG. 1 is a front view of an upright video gaming machine according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

The present application relates to a gaming machine 10 with an overhanging touch screen that is controlled by a computer microprocessor operating in response to a wager by a machine user. Turning now to the drawings and referring initially to FIGS. 1 and 3, there is depicted a gaming machine 10 that may be used to implement a basic game and a bonus game. The gaming machine 10 comprises a display 11 that includes a video portion 14 and a non-video portion 15. The gaming machine further comprises a unitary transparent touch screen 12 that overlaps both the video portion 14 and at least a part of the non-video portion 15 of the display 11. The transparent touch screen 12 allows visibility of that which the touch screen 12 overlaps.

In the illustrated embodiment of FIG. 1, the video gaming machine 10 comprises an "upright" version in which the display 11 is oriented vertically relative to the player. It will be appreciated, however, that any of several other models of gaming machines are within the scope of the present invention including, for example, a "slant-top" version in which the display 11 is slanted at approximately a thirty degree angle toward the player. In one embodiment, the gaming machine 10 is operable to play a game entitled WINNING BID™ and features a basic game in the form of a slot machine with five simulated spinning reels (see FIGS. 1 and 3) and a bonus game having an art auction theme. It will be appreciated, however, that the gaming machine 10 may be implemented with games other than WINNING BID™ and/or with any of several alternative game themes.

The touch screen 12 may use an X-Y matrix of optically transparent switches to detect the location of a touch. Alternatively, the touch screen 12 may use well-known techniques such as resistive membranes, acoustic surface waves, and capacitance sensing to detect the location of a touch. Suitable touch screens for implementing the present invention are commercially available from Elo Touchsystems of Fremont, Calif., and MicroTouch Systems, Inc., of Methuen, Mass.

Figure 4:
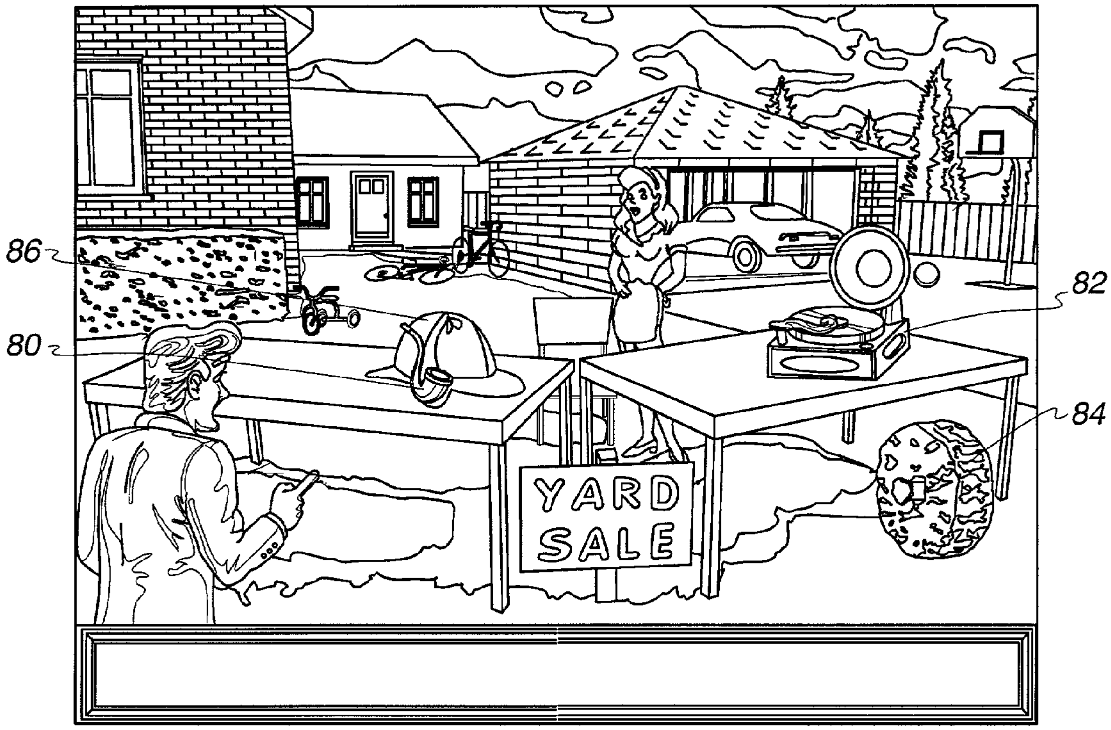
FIG. 4 is a screen capture of a video portion of the display showing an item selection screen of a bonus game with an auction theme.

Referring back to FIG. 1, the video portion 14 of the display 11 is a CRT video graphics monitor that is disposed behind the touch screen 12. Alternatively, the video portion 14 of the display 11 may comprise a dot matrix, LED, LCD, electro-luminescent, or generally any type of video display commonly known in the art able to be viewed behind the touch screen 12. In the illustrated embodiment, the video portion 14 of the display 11 is commercially available from Wells-Gardner® of Chicago, Ill. The video portion 14 of the display 11 may include graphical or static player-selectable first indicia that are selectable via the unitary touch screen 12. As shown in FIG. 4, the player-selectable first indicia may include a pipe 80, a phonograph 82, a wheel of cheese 84, and a Sherlock Holmes-style hat 86. The non-video portion 15 of the display 11 is preferably a back-lit glass artwork panel that includes static player-selectable second indicia printed thereon and selectable via the touch screen 12. As shown in FIG. 3, the second indicia may be a "Spin Reel" button 66, a "Bet Per Line" button 58, a "Max Bet Spin" button 54, a "Select Lines" button 56, a "Collect" button 64, a "Help" button 62, and a "Pay Table" button 60. Lights or other means to illuminate the player-selectable second indicia are located behind the artwork panel. These lights illuminate when the CPU 20 directs the particular zones to be active. When a player-selectable indicia is active, the player may contact a portion of the touch screen 12 that overlays the active player-selectable indicia to generate a game function associated with the selected indicia.

As shown in FIGS. 1 and 3, the non-video portion 15 of the display 11 is located immediately adjacent and below the video portion 14 of the display 11. It is contemplated in accordance with the present invention, however, that the non-video portion 15 of the display 11 that is overlaid by the touch screen could be disposed above and/or to either side of the video portion 14. As briefly mentioned above and as shown in FIGS. 1 and 3, the touch screen 12 is larger than the video portion 14 of the display 11. This design allows not only the touch screen 12 to overlay the video portion 14 of the display 11, but also allows a portion of the touch screen 12 to overlap the non-video portion 15 where a back-lit glass panel displays static game features such as player-selectable indicia, text, or numerical figures without requiring a video monitor to be present at that portion of the display.

Placement of the touch screen 12 so that it partially overlaps a non-video portion 15 of the display 11 allows game manufacturers and creators to devote more space on the video portion 14 of the display 11 to dynamic graphical images and game icons while maintaining display space for static features. Game manufacturers and creators are able to locate static features such as images, text, numerals, and icons on the non-video portion 15 of the display 11, reducing or eliminating the amount of essential display space from the video portion 14 of the display 11 that is occupied by static features. The large touch screen 12 that covers and overlays the video portion 14 and the non-video portion 15 of the display 11 provides users with the appearance of a large display, whereas the manufacturer is only required to provide a video portion of the display that is large enough to display dynamic features and other items requisite for game play. Thus, since the touch screen 12 overlaps the non-video portion 15 of the display 11, wherein some static player-selectable indicia are located, the video portion 14 of the display 11 is maximized for dynamic game play and design.

Increasing the touch screen 12 from a size that merely overlaps the video portion 14 of the display 11 to a touch screen 12 that additionally overlaps the non-video portion 15 of the display 11 does not dramatically or significantly increase the materials cost to a gaming machine manufacturer. In comparison to the modest cost of purchasing an enlarged touch screen, using a video display so that the size of the video display would be equivalent to the size of the overlapping touch screen 12 would be extremely expensive and cost prohibitive to purchase and significantly increase the total material cost of the gaming machine. A larger touch screen that partially overlays a video portion 14 and partially overlays a non-video portion 15, as described above, is much less expensive than a video display that is the same size as the larger touch screen. Thus, purchasing a larger touch screen at a cost that is simply marginally more expensive than the previously sized touch screen and maintaining the video display at the same size as the previous screen creates more space on the video portion 14 for dynamic game features, provides the appearance of a larger display, and allows more entertainment at a lower incremental cost.

FIG. 2 is a block diagram of a control system suitable for operating the gaming machine 10. A coin/credit detector 18 signals a microprocessor or central processing unit (CPU) 20 when a player has inserted a number of coins or played a number of credits. Generally, a CPU is a central unit containing logic circuitry that executes the instructions of a computer program. In operation, the CPU 20 executes a basic game program that causes the video portion 14 of the display 11 to display a basic reel game that includes simulated reels with symbols displayed thereon (see FIG. 3). The player may select the number of pay lines to play and the amount to wager via touch screen input player-selectable indicia. The basic game commences in response to the player activating a switch 22 (e.g., by pulling a lever or pushing a button), causing the CPU 20 to set the reels in motion, randomly select a game outcome, and stop the reels to display symbols corresponding to the pre-selected game outcome. In one embodiment, certain basic game outcomes cause the CPU to enter a spinning reel pay feature entitled "Super Scatter" or a bonus mode, causing the display 11 to show a bonus game.

A system memory 24 stores control software, operational instructions, and data associated with the gaming machine 10. In one embodiment, the system memory 24 comprises a separate read only memory (ROM) and battery-backed random access memory (RAM). It will be appreciated, however, that the system memory 24 may be implemented on any of several alternative types of memory structures or may be implemented on a single memory structure. A payoff mechanism 26 is operable in response to instructions from the CPU 20 to award a payoff of coins or credits to the player in response to certain winning outcomes that may occur during the basic game or the bonus game. The payoff amounts corresponding to certain combinations of symbols in the basic game and the bonus game are predetermined according to a pay table stored in system memory 24 and accessed by pressing the "Pay Table" button 60.

The graphics and pictures shown on the video portion 14 and non-video portion 15 of the display 11 in FIGS. 1 and 3 are merely illustrative of a reel game. It is contemplated in accordance with the present invention that numerous different types of reel games can be featured within the gaming machine 10. It should also be appreciated that the gaming machine 10 may be implemented with, instead of in addition to, games displaying a wide variety of game themes. For example, the gaming machine 10 may also be implemented with a video card game, a video roulette game, a video keno game, and many other games that are known in the art.

As shown in FIG. 3, the basic reel game is implemented on the video portion 14 of the display 11 and visible through the touch screen 12 on five simulated spinning reels 30, 32, 34, 36, 38 with nine paylines 40-48. Generally, game play is initiated by inserting a number of coins or playing a number of credits, causing the CPU 20, as described with reference to FIG. 2, to activate a number of paylines corresponding to the number of coins or credits played. In one embodiment, the player selects the number of paylines (between one and nine) to play by pressing the "Select Lines" button 56. The player then chooses the number of coins or credits to bet on the selected paylines by pressing the "Bet Per Line" button 58.

After activation of the paylines, the reels 30, 32, 34, 36, 38 may be set in motion by touching one or more of the "Spin Reel" buttons 66. It is also contemplated in accordance with the present invention that a reel game may have a single "Spin Reels" button for activating all of the reels. A player bets the maximum amount per line by using a "Max Bet Spin" button 54. Alternatively, other mechanisms such as, for example, a lever or push button may be used to set the reels in motion. The CPU 20 uses a random number generator (not shown) to select a game outcome corresponding to a particular set of reel "stop positions." The CPU 20 then causes each of the video reels 30, 32, 34, 36, 38 to stop at the appropriate stop position in accordance with the game outcome. Video symbols are displayed on the reels 30, 32, 34, 36, 38, located on the video portion 14 of the display 11, to graphically illustrate the reel stop position and indicate whether the stop position of the reels represents a winning game outcome.

Winning reel game outcomes (e.g., symbol combinations resulting in payment of coins or credits) are identifiable to the player by a pay table. In one embodiment, the pay table is affixed to the machine 10 and/or displayed by the video display in response to a command by a player (i.e., by pressing the "Pay Table" button 60). A winning reel game outcome occurs when the symbols appearing on the reels along an active pay line correspond to one of the winning combinations on the pay table. A winning combination, for example, could be three or more of the same symbol across an active pay line. If the displayed symbols stop in a winning combination, the game credits the player an amount corresponding to the award in the pay table for that combination multiplied by the amount of credits bet on the winning pay line. The player may collect the accumulated credits by pressing the "Collect" button 64.

When an active payline displays certain symbols or symbol combinations, the CPU 20 enters the bonus game. Upon entering the bonus game, the CPU 20 operates to replace the display of the reels on the video portion 14 of the display 11 with a bonus game screen. FIG. 4 is a depiction of a bonus game screen depicting a first stage of a bonus game of the present invention. The bonus game screen of FIG. 4 has a "Yard Sale" theme that provides the player with an opportunity to choose an item located on the video portion 14 of the display 11 that is to be featured in a later award presentation portion of the bonus game.

In one embodiment of the present invention, the CPU 20 randomly selects a predetermined number of items to be displayed on the items display screen of FIG. 4. The player is able to select one of the items by contacting the touch screen 12 over the desired item. After such selection, the CPU 20 operates to replace the item selection screen with an award presentation screen having an auction theme.

Figure 5:
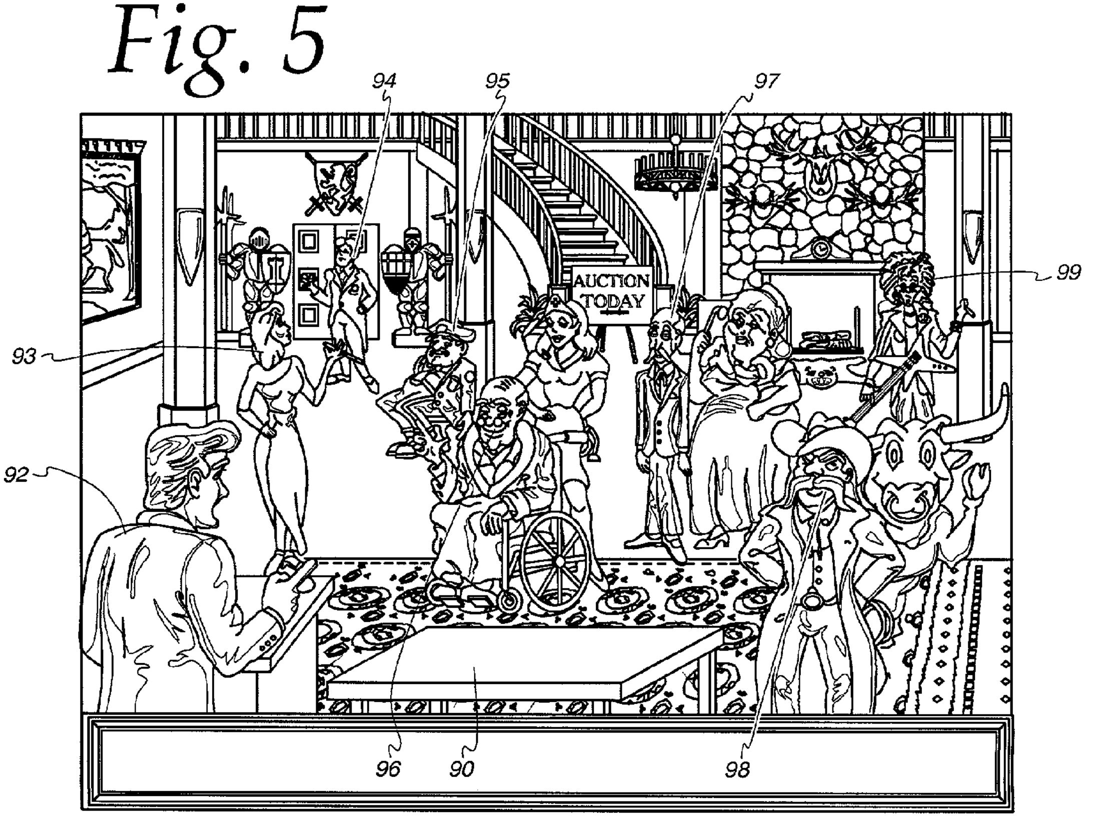
FIG. 5 is a screen capture of a video portion of the display showing an award presentation screen of a bonus game with an auction theme.

FIG. 5 is an illustration of the award presentation screen. The award presentation screen represents an auction house displaying the selected item on a table or other displaying device, an auctioneer, and other bidding characters. An auction award presentation screen will allow the CPU 20 to present various characters "bidding" on the selected and displayed object. In one embodiment, the player starts the auction by contacting the touch screen 12 over the area of one of the displayed characters, causing that character to make an opening bid. The value of the opening bid is determined randomly by the CPU 20. On the award presentation screen of FIG. 5, the auctioneer starts the bidding at the opening bid and the selected character accepts the bid. Thereafter, the CPU 20 selects characters to continue the bidding and the auction continues with raises of the opening bid until one of the characters makes a final winning bid. For each bid after the opening, the CPU 20 generates a random number that is multiplied by the desire factor of each character and the character with the highest product makes a bid on the auction. The CPU 20 then awards the player the amount of the final bid multiplied by the line bet and returns the player to the basic game.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A gaming machine controlled by a processor in response to a wager, said gaming machine comprising:

a display including a video portion and a non-video portion, wherein said video portion displays a plurality of symbols indicating a randomly selected outcome of a wagering game; and a unitary touch screen overlapping both said video portion and said non-video portion, said video portion including player-selectable first indicia selectable via said unitary touch screen and said non-video portion including permanent player-selectable second indicia selectable via said unitary touch screen.

2. The gaming machine of claim 1, wherein said video portion and said non-video portion are immediately adjacent each other.

3. The gaming machine of claim 1, wherein said non-video portion includes an artwork panel.

4. The gaming machine of clam 3, wherein said second indicia are selectively illuminated by lights located behind said artwork panel to indicate which of said second indicia are active and can be selected by a player.

5. The gaming machine of claim 3, wherein said second indicia are printed on said artwork panel.

6. The gaming machine of claim 1, wherein said second indicia are selected from a group consisting of a "Spin Reels" button, a "Bet Per Line" button, a "Max Bet Spin" button, a "Select Lines" button, a "Collect" button, a "Help" button, and a "Pay Table" button.

7. The gaming machine of claim 1, wherein said non-video portion is located below said video portion.

8. The gaming machine of claim 1, wherein said first indicia vary in at least one of location and function depending upon a segment of a game being played on the gaming machine.

9. The gaming machine of claim 1, wherein said video portion includes a display of at least one of a reel game, a video card game, a video roulette game, and a video keno game.

10. The gaming machine of claim 1, wherein said video portion includes a display of a bonus game in response to a bonus outcome being achieved.

11. A gaming machine controlled by a processor in response to a wager, said gaming machine comprising:

a display including a video portion and a non-video portion; and a unitary touch screen overlapping both said video portion and said non-video portion, said video portion including player-selectable first indicia selectable via said unitary touch screen and said non-video portion including permanent player-selectable second indicia selectable via said unitary touch screen wherein said non-video portion includes an artwork panel and said second indicia are selectively illuminated by lights located behind said artwork panel to indicate which of said second indicia are active and can be selected by a player, each of said second indicia being illuminated independently of other second indicia.

* * * * *